United States Patent
Benn et al.

(10) Patent No.: US 6,396,239 B1
(45) Date of Patent: May 28, 2002

(54) PORTABLE SOLAR GENERATOR

(76) Inventors: William M. Benn; John T. Benn, both of 3585 Caminito Carmel Landing, San Diego, CA (US) 92130

( * ) Notice: Subject to any disclaimer, the term of this patent is extended or adjusted under 35 U.S.C. 154(b) by 0 days.

(21) Appl. No.: 09/828,114

(22) Filed: Apr. 6, 2001

(51) Int. Cl.$^7$ .......................... H02J 7/00; H01M 10/44
(52) U.S. Cl. ....................................... 320/101; 307/150
(58) Field of Search .......................... 320/101; 136/243, 136/244, 246, 251; 307/64, 66, 149, 150

(56) References Cited

U.S. PATENT DOCUMENTS

| | | | | |
|---|---|---|---|---|
| 3,837,667 A | * | 9/1974 | Sernovitz | 280/47.17 |
| 4,117,294 A | * | 9/1978 | Appelquist et al. | 219/722 |
| 5,111,127 A | * | 5/1992 | Johnson | 320/101 |
| 6,201,181 B1 | | 3/2001 | Azzam | 136/244 |

* cited by examiner

*Primary Examiner*—Gregory Toatley
(74) *Attorney, Agent, or Firm*—John R. Ross; John R. Ross, III

(57) ABSTRACT

A portable PV modular solar generator. A plurality of wheels are attached to the bottom of a rechargeable battery container. At least one rechargeable battery is contained inside the rechargeable battery container. A power conditioning panel is connected to the rechargeable battery container. At least one photovoltaic panel is pivotally connected. In a preferred embodiment, the rechargeable battery container is a waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable or receiving auxiliary power inputs.

18 Claims, 6 Drawing Sheets

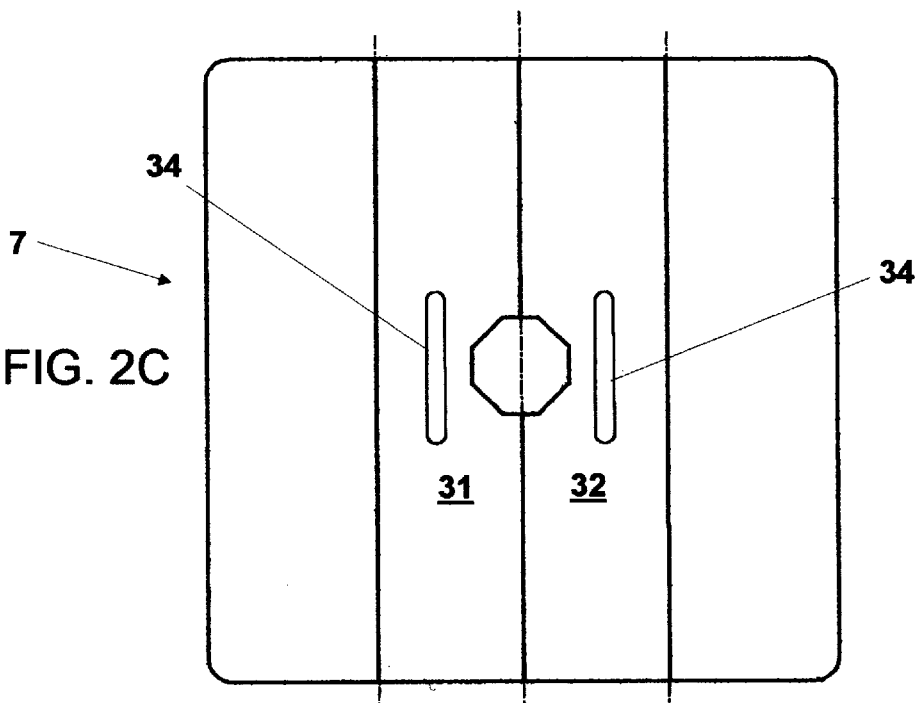
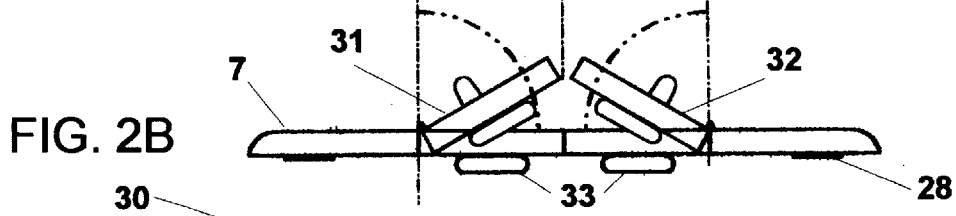
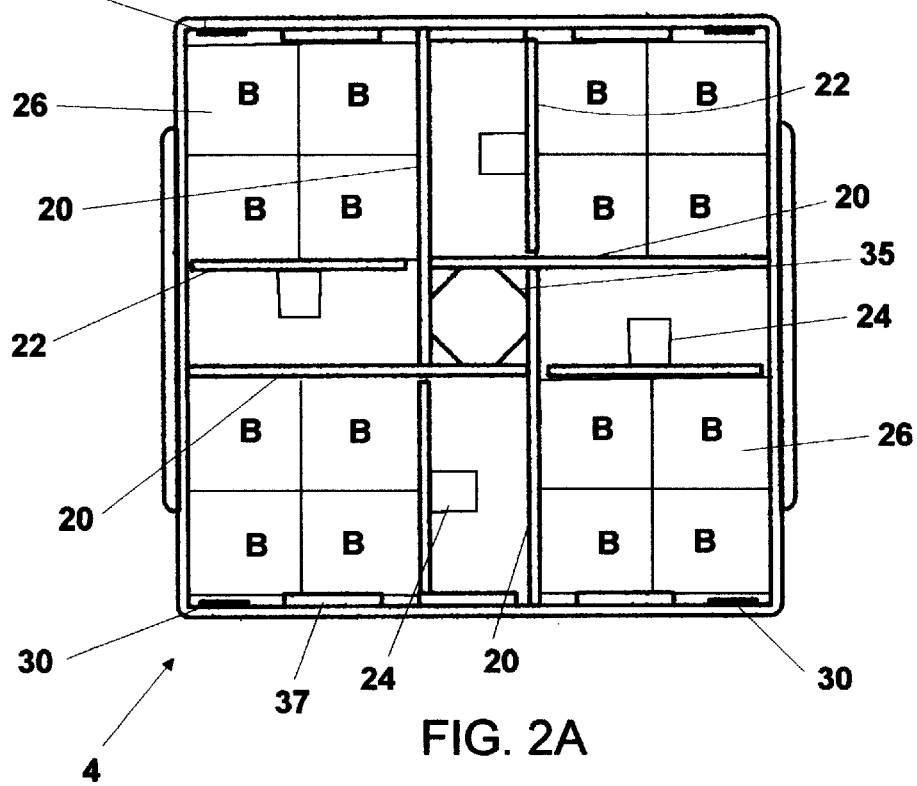

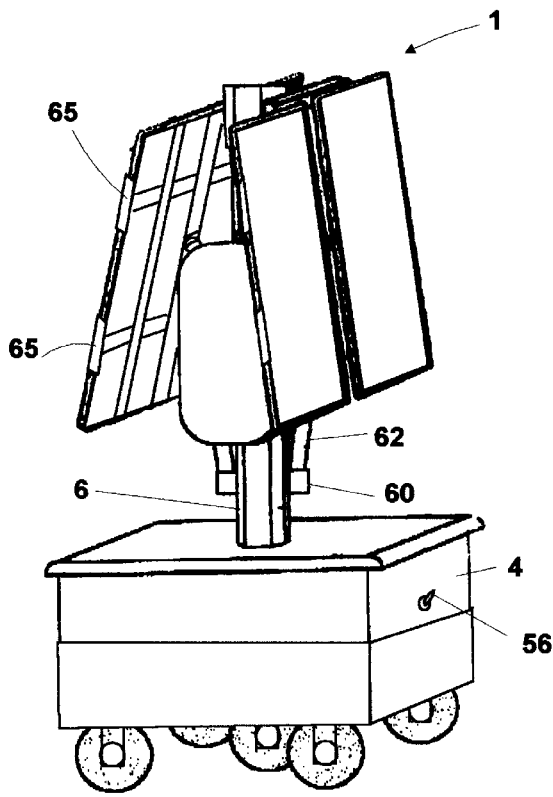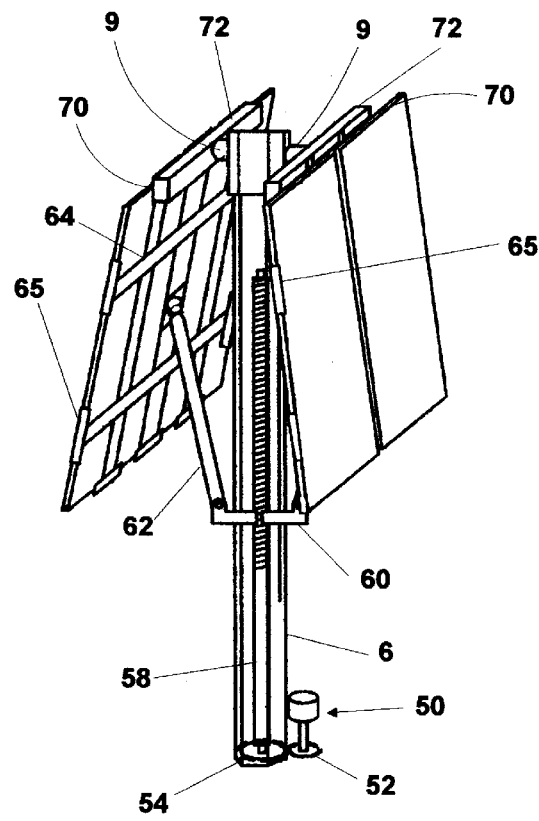
FIG. 3
FIG. 4
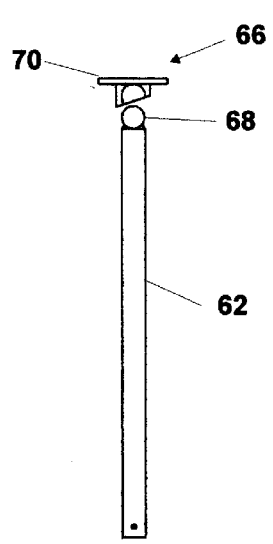
FIG. 5
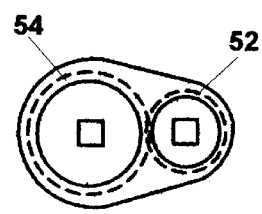
FIG. 6

PORTABLE SOLAR GENERATOR

The present invention relates to solar electric generators, and in particular, to portable solar electric generators.

BACKGROUND OF THE INVENTION

In recent years, the cost of generating electricity has increased dramatically. In California, the monthly electric bill for many consumers has more than doubled in the past year. Rolling blackouts, a condition in which geographical sections of the community are alternately cut-off from receiving electricity during an electrical shortage crisis, are becoming increasingly commonplace with more predicted for the summer of 2001. As our planet's natural resources are depleted and as population increases, the importance of effectively harnessing alternative methods of generating electricity has increased.

Solar Energy

Photovoltaic panels (also called solar panels) are well known and are used to generate electricity from sunlight. Sunlight is "free" and so the cost of electricity generated by a photovoltaic panel is extremely low. However, solar energy is not widely used to generate electricity for residences because of the expense associated with installing a solar energy system onto a residence. Typically, photovoltaic panels are currently fixedly attached to the roof of a house and wired directly into the home's electrical system. Some disadvantages include the fact that the roof may not be optimum location on the home owner's property to receive the best, most direct sunlight. Also, once the system is installed, it is permanent. In other words, if the homeowner moves to a new home, he cannot take the solar generating system with him. Also, it is extremely expensive to install a roof mounted solar generating system. Current estimates range from $20,000 to $30,000.

Prior Art Portable System

U.S. Pat. No. 6,201,181, issued to Azzam, discloses a portable modular solar cart. However, the cart disclosed by Azzam is inadequate for effectively supplying enough energy to satisfy the needs of a typical residence.

What is needed is a better portable solar generator.

SUMMARY OF THE INVENTION

The present invention provides a portable PV modular solar generator. A plurality of wheels is attached to the bottom of a rechargeable battery container. At least one rechargeable battery is contained inside the rechargeable battery container. A power conditioning panel, is connected to the rechargeable battery container. At least one photovoltaic panel is pivotally connected. In a preferred embodiment, the rechargeable battery container waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable or receiving auxiliary power inputs.

BRIEF DESCRIPTION OF THE DRAWINGS

FIG. 2A shows a preferred batter enclosure.

FIGS. 2B and 2C show a preferred battery enclosure lid.

FIG. 3 shows a preferred embodiment in its non-deployed position

FIG. 4 shows a detailed view of the mast shown in FIG. 3.

FIG. 5 shows details of a ball and socket joint.

FIG. 6 shows details of gears shown in FIG. 4.

DETAILED DESCRIPTIONS OF THE PREFERRED EMBODIMENTS

Figure 1:
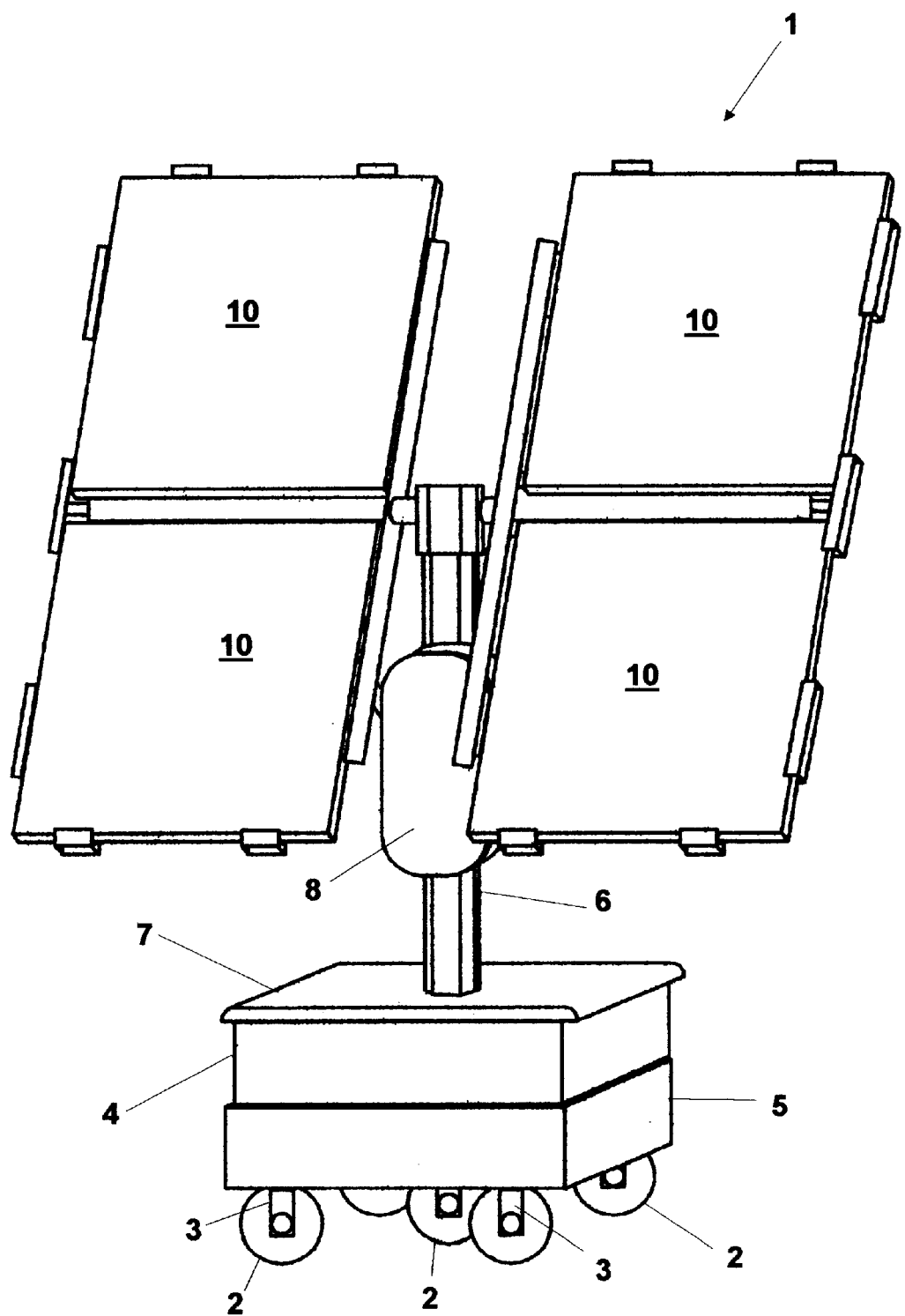
FIG. 1 shows a preferred embodiment of the present invention.

FIG. 1 shows a perspective view of a preferred embodiment of the present invention. Five wheels 2 are rotatably mounted on wheel supports 3 of photovoltaic modular platform 1. Wheel supports 3 are pivotally mounted to the bottom of battery enclosure carriage 5. Battery enclosure 4 is inserted inside battery enclosure carriage 5. Mast 6 extends upward through the center of battery enclosure 4. Power conditioning panel 8 is rigidly attached to the side of mast 6. Rotation bar 9 is rotatably connected to the top of mast 6 and is capable of rotatably positioning solar panels 10 at various angles. It is estimated that in a preferred embodiment, modular platform 1 (having 16 lead acid batteries weighting 60 lbs each and having 4 solar panels 10 weighing 25 lbs each) weighs less than approximately 1200 lbs.

Battery Enclosure

A top view of the interior of battery enclosure 4 is shown in FIG. 2A. Battery enclosure 4 contains four fixed walls 20 rigidly attached to battery enclosure 4. Four moveable walls 22 are slidingly mounted to tracks 24 and are each capable of being locked in position along track 24. Four lead acid batteries are arranged adjacent to each other in the corners of battery enclosure 4. Moveable walls 22 are slid along tracks 22 and then locked in place so that batteries 26 are held flush against one another. Battery enclosure 4 also has mast support cutout section 35 to provide support for mast 6 (FIG. 1).

FIG. 2B shows a side view and FIG. 2C shows a top view of battery enclosure lid 7. Lid connector extensions 28 are arranged to properly align lid 7 over battery enclosure 4 when lid connector extensions 28 are inserted into slots 30. By lifting up on handles 34, hinged sections 31 and 32 of lid 7 can be opened. When sections 31 and 32 are raised knife switch connections 33 are broken (see also FIG. 8). Wires (not shown) leading to and from batteries 26 are run through battery raceways 37. In the preferred embodiment, after lid 7 is placed on battery enclosure 4, battery enclosure 4 is waterproof.

Deployment of PV Panels

FIG. 4 shows a cut out view of mast 6. DC motor 50 is engaged with gear 52, which is engaged with gear 54. A detail view of gears 52 and 54 are shown in FIG. 6. By switching switch 56 (FIG. 3) to "on", DC motor 50 is started. This causes gear 52 to turn gear 54, which turns erector screw 58. Erector arm support 60 is threaded onto erector screw 58 so that when erector screw 58 is turned, erector arm support 60 is raised. Erector arm 62 is connected to solar panel support brace 64 via ball and socket joint 66. Erector arm 62 and ball 68 and socket 70 of ball and socket joint 66 is shown in detail in FIG. 5. Socket 70 is also shown attached to solar panel support brace 64 in FIG. 9.

Solar Panel Support Braces

Figure 9:
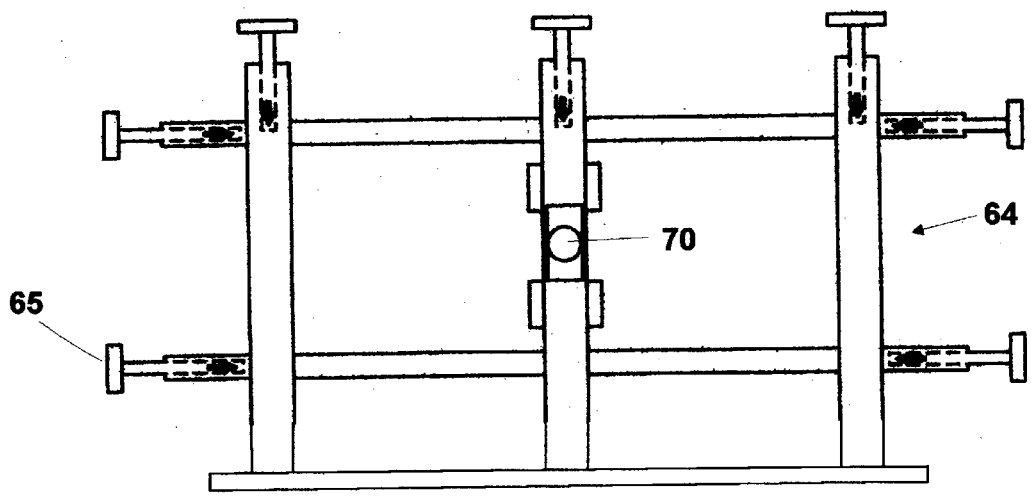
FIGS. 9 and 10 show a preferred solar panel support brace.
Figure 10:
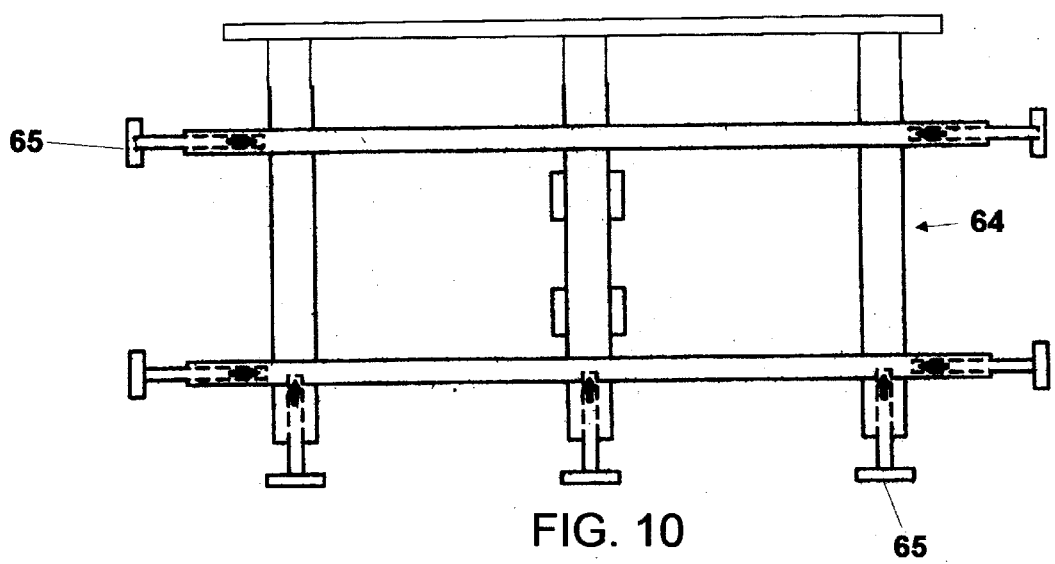

FIG. 9 shows a bottom view and FIG. 10 shows a top view of solar panel support braces 64. Solar panels 10 are held in place on solar panel support braces 64 by spring loaded clamps 65. Solar panel support braces 64 (FIG. 4) are connected to support bars 72 at a hinge at connection points. 70. Support bars 72 are rigidly connected to rotation bar 9. As erector screw 58 raises erector arm support 60, erector arms 62 push upward on solar panel support braces 64 causing them to raise and pivot about connection points 70.

Figure 7:
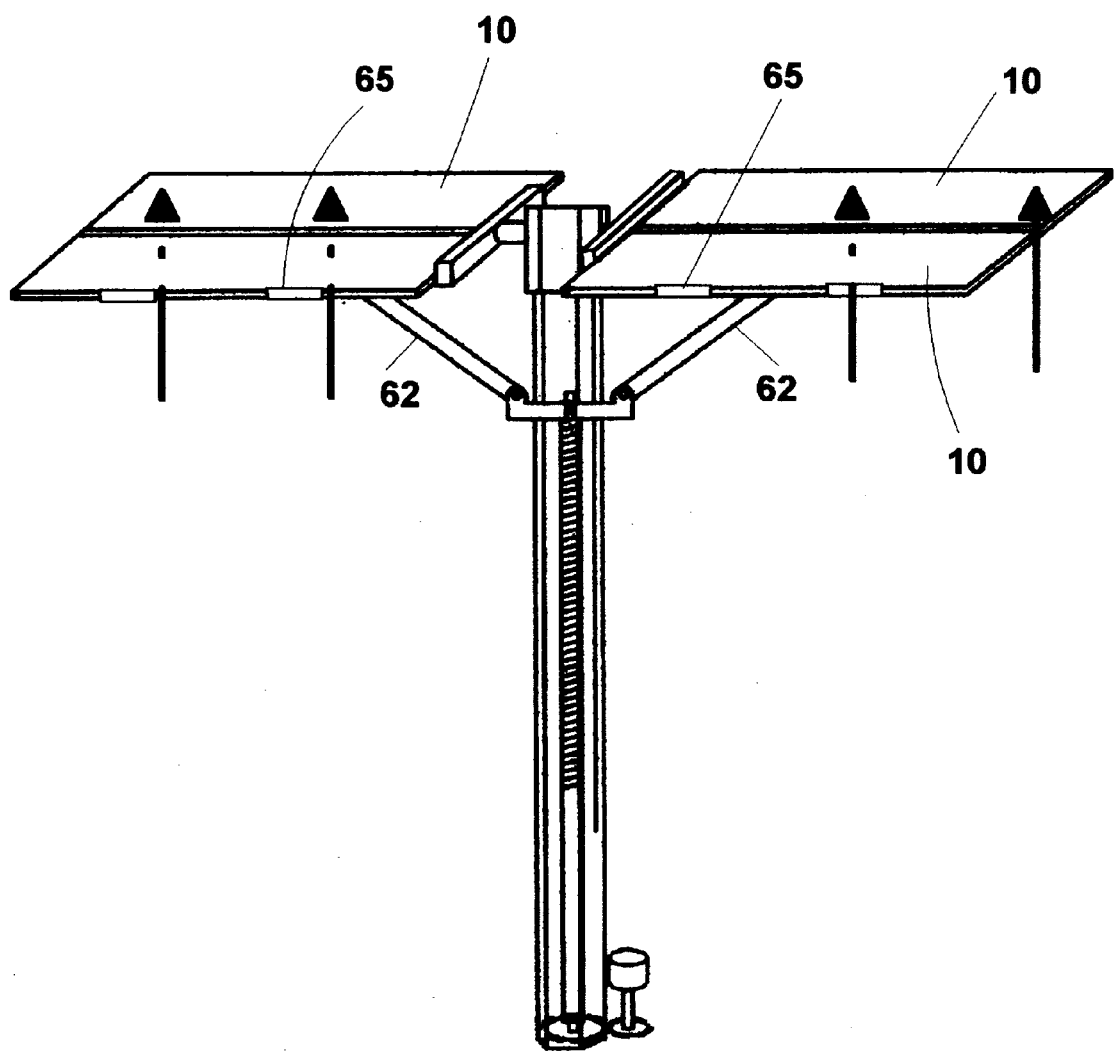
FIG. 7 shows a preferred embodiment in its erected position.

When erector arm support 60 is fully raised, solar panel support braces. 64 will be in the erected position shown in FIG. 7. By manually pressing upward on solar panel support braces 64 at a position shown by the arrows in FIG. 7, solar panels 10 will easily rotate about the axis of rotation bar 9 to the deployed position shown in FIG. 1.

Electrical Components

Figure 8:
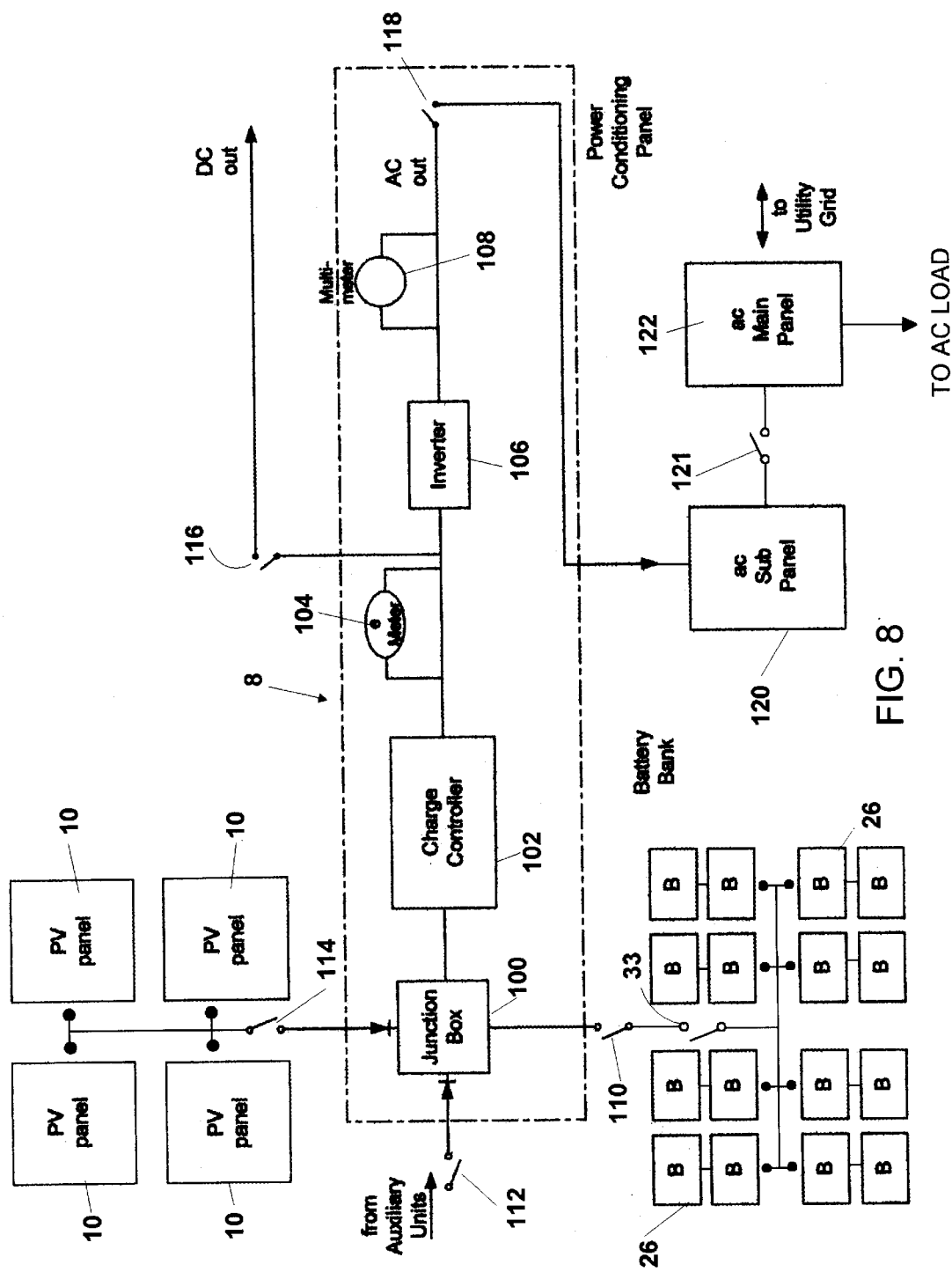
FIG. 8 shows a simplified drawing of the electrical components of the preferred embodiment.

The electrical components of the preferred embodiment of the present invention are shown in FIG. 8. Preferably, junction box 100, charge controller 102, DC volt meter 104, inverter 106, and AC multimeter 108 are all contained within power conditioning panel 8. In the preferred embodiment, power conditioning panel 8 (also shown in FIG. 1) is waterproof.

PV panels 10 and batteries 26 are connected to junction box 100. In a preferred embodiment each PV panel 10 is capable of generating approximately 120 watts of electricity when impacted by direct sunlight. In the preferred embodiment, junction box 100 can also receive DC electrical input from auxiliary power units. PV panels 10 are connected to junction box 100 through switch 114, batteries 26 are connected to junction box 100 through switch 110 and the auxiliary power units are connected to junction box 100 through switch 112. As a safety device, the preferred power conditioning panel 8 is configured to automatically open switches 114, 112 and 110 whenever the door of power conditioning panel 8 is opened, thereby preventing a potential mishap.

When sunlight strikes PV panels 10, electricity is generated and flows from PV panels 10 to junction box 100. Charge controller 102 monitors the condition of batteries 26 to ensure that they are not overcharged, or drained too much. If batteries 26 require further charging, electricity will be directed from junction box 100 to batteries 26 for charging. The current flow will pass, through switch knife switch connection 33 (see also FIG. 2B) which is usually in the closed position.

DC electricity will flow from either PV panels 10 or batteries 26 through charge controller 102 where its level is preferably monitored by DC voltmeter 104. DC current can be routed to a DC load by closing switch 116. Electricity then flows through inverter 106 where the current is converted to AC. Preferably multimeter 108 monitors the level of AC current. AC current then flows through switch 118 (normally closed) to AC sub panel 120.

AC sub panel 120 is configured so that electricity coming from power conditioning panel 8 can be routed to specific areas within the AC load. For example, if the AC load is a residence the residence owner may decide that he wants to power his kitchen using electricity generated by PV modular platform 1. The owner can then close the breaker within AC sub panel 120 representing the kitchen. Electricity will then flow from AC sub panel 120 through safety switch 121 through AC sub panel 122 where it will be directed to the kitchen. To save money spent on purchasing electricity supplied through the utility grid, the owner can then open the breaker in AC main panel 122 from the utility grid for the kitchen. In this instance, the kitchen would be getting its entire electrical needs from PV modular platform 1 and not from the utility grid.

In the first preferred embodiment, PV panels 10 are wired in parallel (see FIG. 8). In the first preferred embodiment, PV panels 10 are 12 volt solar panels that can provide approximately 120 watts of power, so when wired in parallel they will provide a total of 480 watts at 12 volts DC. In the first preferred embodiment lead acid batteries 26 are low cost 6 volt lead acid batteries. As shown in FIG. 8, these are wired in series, in sets of two, to provide a 12 volt DC output. The sets of two are then wired in parallel. Typical energy stored in these individual sets of batteries is 350 amp-hours per set of two.

Therefore, with 8 sets the storage capacity will be approximately 2800 amp-hours.

Second Preferred Embodiment

In the first preferred embodiment, PV modular platform was shown as a stand alone platform. In the second preferred embodiment, two auxiliary PV modular platforms are added to a main PV modular platform 1. The auxiliary PV modular platform is similar in design to PV modular platform 1 described above with the exception that the auxiliary PV modular platform preferably does not contain an inverter. The inverter is unnecessary because the DC current from the auxiliary unit will feed directly into the main PV modular platform 1 at via switch 112 (FIG. 8).

By connecting two auxiliary PV modular platforms to PV modular platform 1, the entire system can provide approximately 1.2 kilowatts. This is enough to power a house. It is estimated that the total purchase price for two auxiliary PV modular platforms and a main PV modular platform is approximately $11,000. If the current monthly electric bill for a residential electricity user is $300/month, it will take slightly more than three years before a purchaser of the second preferred embodiment recovers his cost.

Some Advantages of the Present Invention

The compact size, flexibility, mobility and modularity of the present invention provides an easy to install and maintain device. The present invention is a significant benefit to the community. It provides an independent distributed power source that can eliminate power blackouts or brownouts for users.

Although the above-preferred embodiments have been described with specificity, persons skilled in this art will recognize that many changes to the specific embodiments disclosed above could be made without departing from the spirit of the invention. For example, although the second preferred embodiment discusses connecting the main PV modular platform to two auxiliary PV modular platforms, it is also possible to connect it to just one auxiliary PV modular platforms or more than two auxiliary PV modular platforms. Also, it is possible to have other devices capable of generating electricity connected to a main PV modular platform, such as a windmill or a fuel-burning generator. Also, although FIG. 8 showed PV panels 10 wired in parallel, they could also be wired in series. Also the batteries 26 could be wired in series or parallel depending on the application of the system. Also, although the above described embodiments showed lead acid batteries 26 charged by the present invention, the present invention could be used to charge fuel cells. Therefore, the attached claims and their legal equivalents should determine the scope of the invention.

We claim:

1. A portable PV modular solar generator, comprising:
   A) a waterproof battery enclosure comprising a knife switch connection,
   B) a plurality of wheels attached to the bottom of said waterproof battery enclosure,
   C) a plurality of rechargeable batteries contained inside said waterproof battery enclosure,
   D) a mast comprising a rotation bar, wherein said mast is supported by said waterproof battery enclosure,
   E) at least one solar panel support brace attached to said rotation bar, wherein said at least one solar panel support brace is capable of pivoting about the axis formed by said rotation bar,
   F) at least one photovoltaic panel supported by said at least one solar panel support brace,
   G) a waterproof power conditioning panel comprising a door, said waterproof power conditioning panel attached to said mast, wherein said waterproof power conditioning panel comprises at least one safety switch that opens breaking an electric circuit when said door is opened, said waterproof power conditioning panel further comprising:
      i) a charge controller electrically connected to said at least one photovoltaic panel and said at least one rechargeable battery, and
      ii) an inverter electrically connected to said charge controller, and
   H) an auxiliary power input device electrically connected to said charge controller.

2. A portable PV modular solar generator, comprising:
   A) a rechargeable battery container for containing up to approximately 960 pounds of rechargeable batteries,
   B) a plurality of wheels attached to the bottom of said rechargeable battery container,
   C) at least one rechargeable battery contained inside said rechargeable battery container,
   D) a power conditioning panel for containing at least one electrical component wherein said at least one electrical component is connected to said at least one rechargeable battery, and
   E) at least one pivotally connected photovoltaic panel, wherein said portable PV modular generator is capable of being easily positioned by one adult male of average strength on a substantially flat grade when said portable PV modular solar generator is loaded with said approximately 960 pounds of rechargeable batteries, wherein said portable PV modular solar generator when loaded with said approximately 960 pounds of rechargeable batteries is capable of energy storage of approximately 2800 amp-hours.

3. The portable PV modular solar generator as in claim 2, further comprising a mast connected to said rechargeable battery container, wherein said mast comprises a rotation bar, wherein said at least one photovoltaic panel is pivotally connected via said rotation bar.

4. The portable PV modular solar generator as in claim 2, wherein said plurality of wheels attached to the bottom of said rechargeable battery container are pivotally attached.

5. The portable PV modular solar generator as in claim 2, wherein said at least one rechargeable battery contained inside said rechargeable battery container is sixteen rechargeable batteries.

6. The portable PV modular solar generator as in claim 2, wherein said at least one rechargeable battery contained inside said rechargeable battery container is at least one lead acid battery.

7. The portable PV modular solar generator as in claim 2, wherein said at least one rechargeable battery contained inside said rechargeable battery container is at least one fuel cell.

8. The portable PV modular solar generator as in claim 2, wherein said rechargeable battery container is a waterproof battery enclosure.

9. The portable PV modular solar generator as in claim 8, further comprising a mast supported by said waterproof battery enclosure, wherein said mast comprises a rotation bar, wherein said at least one photovoltaic panel is pivotally connected via said rotation bar.

10. The portable PV modular solar generator as in claim 8, wherein said rechargeable battery container further comprises a knife switch connection.

11. The portable PV modular solar generator as in claim 2, wherein said power conditioning panel comprises at least one electrical component.

12. The portable PV modular solar generator as in claim 11, wherein said at least one electrical component comprises:
   A) a charge controller electrically connected to said at least one photovoltaic panel and said at least one rechargeable battery, and
   B) an inverter electrically connected to said charge controller.

13. The portable PV modular solar generator as in claim 2, wherein said power conditioning panel is waterproof.

14. The portable PV modular solar generator as in claim 2, wherein said power conditioning panel comprises:
   A) a door, and
   B) at least one safety switch that opens breaking an electrical circuit when said door is opened.

15. The portable PV modular solar generator as in claim 2, wherein said at least one photovoltaic panel is four photovoltaic panels.

16. The portable PV modular solar generator as in claim 2, further comprising at least one solar panel support brace wherein said at least one photovoltaic panel is supported by said at least one solar panel support brace.

17. The portable PV modular solar generator as in claim 2, further comprising an auxiliary power input device.

18. A portable PV modular solar generator, comprising:
   A) a waterproof battery enclosure containing up to approximately 960 pounds of rechargeable batteries, wherein said waterproof battery enclosure comprises a knife switch connection,
   B) a plurality of wheels attached to the bottom of said waterproof battery enclosure,
   C) a plurality of rechargeable batteries contained inside said waterproof battery enclosure,
   D) a mast comprising a rotation bar, wherein said mast is supported by said waterproof battery enclosure, E) at least one solar panel support brace attached to said rotation bar, wherein said at least one solar panel support brace is capable of pivoting about the axis formed by said rotation bar, F) at least one photovoltaic panel supported by said at least one solar panel support brace, G) a waterproof power conditioning panel comprising a door, said waterproof power conditioning panel attached to said mast, wherein said waterproof power conditioning panel comprises at least one safety switch that opens breaking an electric circuit when said door is opened, said waterproof power conditioning panel further comprising:

i) a charge controller electrically connected to said at least one photovoltaic panel and said at least one rechargeable battery, and ii) an inverter electrically connected to said charge controller, and H) an auxiliary power input device electrically connected to said charge controller, wherein said portable PV modular solar generator is capable of being easily positioned by one adult male of average strength on a substantially flat grade when said portable PV modular solar generator is loaded with said approximately 960 pounds of rechargeable batteries, wherein said portable PV modular solar generator when loaded with said approximately 960 pounds of rechargeable batteries is capable of energy storage of approximately 2800 amp-hours.

\* \* \* \* \*